May 30, 1944.   J. KANTOR   2,350,044

MIXING TANK FOR CARBONATED BEVERAGES

Original Filed Aug. 2, 1941   2 Sheets-Sheet 1

INVENTOR.
JAMES KANTOR,
BY Hood & Hahn
ATTORNEYS.

May 30, 1944.    J. KANTOR    2,350,044
MIXING TANK FOR CARBONATED BEVERAGES
Original Filed Aug. 2, 1941    2 Sheets-Sheet 2

INVENTOR.
JAMES KANTOR,
BY Hood & Hahn
ATTORNEYS.

Patented May 30, 1944

2,350,044

UNITED STATES PATENT OFFICE 2,350,044

MIXING TANK FOR CARBONATED BEVERAGES

James Kantor, Chicago, Ill., assignor to The Liquid Carbonic Corporation, Chicago, Ill., a corporation of Delaware Original application August 2, 1941, Serial No. 405,123. Divided and this application January 5, 1942, Serial No. 425,618

7 Claims. (Cl. 259—24)

The present invention relates to improvements in mixing apparatus primarily designed for mixing carbonated beverages prior to the delivery of the same to the container or to a machine for filling the containers.

Heretofore, it has been almost universal practice, in filling containers with carbonated beverage, to deliver to the container a predetermined quantity of syrup and then fill in the container with the desired amount of carbonated water. After the container has thus been filled, the container is agitated for the purpose of thoroughly mixing the syrup and water together.

In some instances, it has been found that it is more desirable to pre-mix the syrup and carbonated water prior to the delivery of the same to the machine for filling the container.

My present invention relates to a mixing machine for thus pre-mixing the syrup and carbonated water, the apparatus including means for delivering a measured quantity of syrup and a measured quantity of water to the mixing chamber, so that the proportion of syrup and carbonated water will be maintained.

For the purpose of disclosing the invention, I have illustrated an embodiment thereof in the accompanying drawings, in which.

Figure 1:
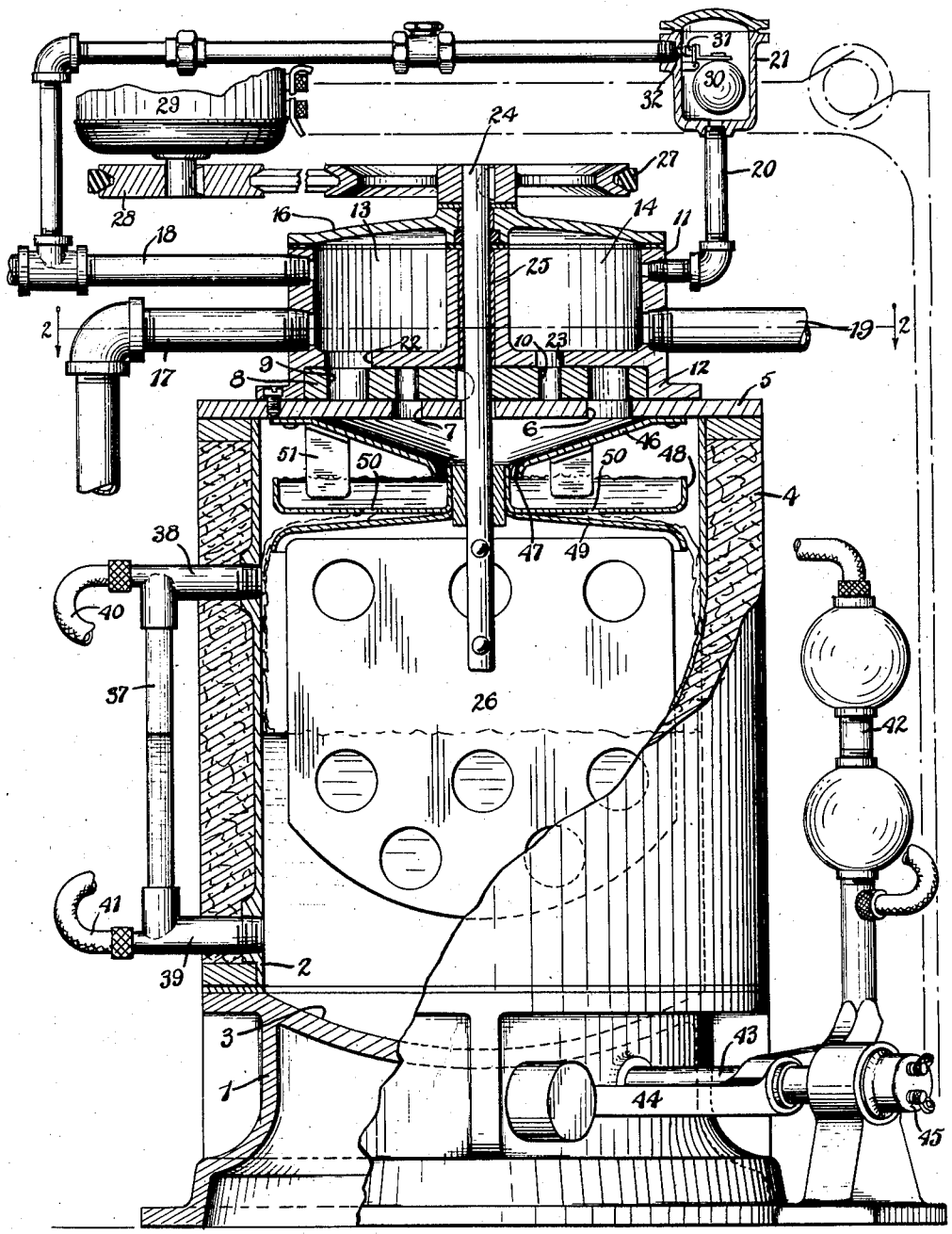
Fig. 1 is a longitudinal section, partly in elevation, of an apparatus embodying my invention.
Figure 2:
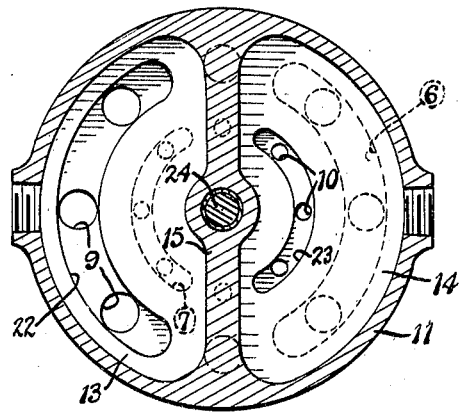
Fig. 2 is a sectional view on the line 2, 2 of Fig. 1.

In the embodiment of the invention illustrated, I provide a base 1 having mounted thereon a suitable mixing container 2 which may be in the form of a suitable cylinder mounted on the base 1 and having its lower end cooperating with the concave face 3 of the base 1 to provide a tank. This cylinder is preferably surrounded with insulating material 4 for maintaining the contents of the tank at the low temperature to which it is delivered to the tank. The top of the tank is closed by a top plate 5 having provided therein an arcuate water inlet opening 6 which is concentrically arranged relative to the vertical axis of the tank 4 and an arcuate syrup inlet opening 7, smaller than the opening 6. Mounted above and rotatable relatively to the top 5 is a control valve 8. This control valve is provided with a series of valve openings 9 arranged concentrically to the axis of the valve and adapted, during the operation of the valve, to coincide with the opening 6 in the top 5. The openings 9, in effect, constitute measuring cups for determining the quantity of carbonated water delivered to the tank. The valve 8 is also provided with a second series of arcuately arranged openings 10 passing therethrough and adapted to cooperate with the opening 7. These openings 10 likewise constitute measuring cups for determining the proper quantity of syrup to be delivered to the container. It is to be noted that the measuring cups 10 are considerably smaller than the cups 9. The relative size of the cups 9 and 10 determine the relative quantities of syrup and carbonated water to be delivered to the tank. For instance, in mixing coca cola, the proportions of the syrup to the carbonated water is that of six parts water and one part syrup. Therefore, the cup openings 9 would be six times as large as the cup openings 10.

This valve operates beneath a chambered water and syrup receptacle 11 which may be cylindrical in form and may be bolted or otherwise secured to the head 5. A recess is formed by the annular flange 12 constituting an extension of the side walls of the receptacle to accommodate the valve 8, heretofore described. This receptacle is divided into a water-receiving chamber 13 and a syrup-receiving chamber 14 through a suitable center wall 15 and the receptacle is closed by a top or cover 16. The chamber 13 is adapted to be supplied with carbonated water from a suitable source of supply by an inlet pipe 17. This pipe 17 preferably is connected to a carbonator in which the refrigerated water is adapted to be thoroughly mixed with $CO_2$ gas and the chamber 13 is connected by a pipe 18 to the top of this carbonator for the purpose of returning to the carbonator any $CO_2$ which may escape from the tank and chamber 13 during the mixing operation. The chamber 14 of the receptacle 11 is supplied with syrup through a suitable pipe 19 which is connected to a source of syrup supply, and the top of this chamber is connected by a by-pass 20 through a control valve 21 with the pipe 18 so that any $CO_2$ escaping into the top of the chamber 14 will be delivered back to the carbonator, as is the case with the chamber 13.

The bottom of the chamber 13 is provided with an arcuate slot 22 adapted to coincide with the measuring cups 9 in the valve 8 and the bottom of the chamber 14 is provided with an arcuate slot 23 adapted to cooperate with the measuring cups 10. It is to be noted, however, that the receiving opening 7 in the top 5 is oppositely disposed relatively to the slot 22 so that when the measuring cups 9 are in a receiving position relative to the chamber 13, the bottoms of these cups will be closed by the top 5 and, likewise, when the receiving cups 10 are in receiving position relative to the chamber 14, their bottoms will be closed by the top 5, the relative cups being adapted to discharge only after the valve member has made a half revolution.

For rotating the valve member 8, I provide an axially disposed shaft 24 which extends through a bearing 25 in the wall 15 and has keyed thereto the rotary valve member 8. This shaft 24 also projects into the tank 2 and carries at its lower end an agitating paddle 26. The shaft 24 is driven by suitable pulley belt 27 connected with the drive pulley 28 of an electric motor 29.

The valve 21, which includes a float 30, controlling the movement of a valve member 31 adapted to control a vent opening 32 provides a means for controlling the inflow of the syrup into the chamber 14. Due to the fact that the only vent for the chamber 14 is through the valve opening 32, if the syrup is delivered to the chamber 14 faster than it is withdrawn therefrom, eventually the syrup in the chamber 14 will rise in the pipe 20 into the valve 21, raising the float 30 to cause the valve 31 to seal the opening 32. This closes any venting of the chamber 14 and due to the fact that there is no escape of the air or gas from the top of the chamber, it is obvious that the inflow of the syrup through the pipe 19 will be stopped.

Figure 3:
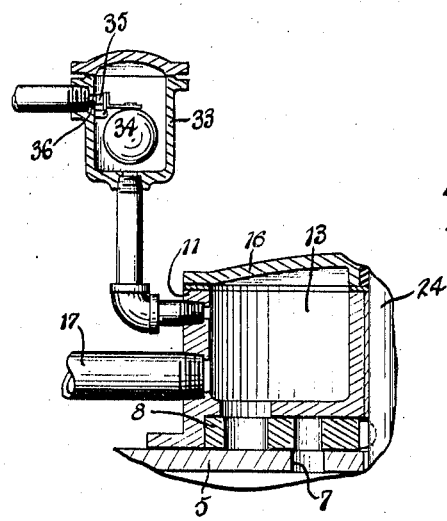
Fig. 3 is a detail view, partly in section, of means for controlling the inflow of water.

A similar water control may be provided as illustrated in Fig. 3 for the chamber 13. In the structure illustrated in Fig. 3, instead of having the chamber 13 connected directly by the pipe 19 with the top of the carbonator, I introduce into this line a control valve 33 provided with a float 34 controlling a valve member 35 which, in turn, controls the escape opening 36. It is obvious that, with a greater inflow of water into the chamber 14 than a discharge therefrom, the water level will build up in the valve 33 until the float 34 is closed, thus preventing any venting of air or gas above the water in the chamber which, of course, will shut off the inflow of water into the chamber until a certain amount thereof has been withdrawn therefrom.

The trunk 2 is provided with a gage glass 37 connected to the top and bottom of the tank through inlet fittings 38 and 39. By this glass, the operator can readily determine the level of the contents of the tank. Furthermore, the fittings 38 and 39 are connected by flexible conduits 40 and 41 with a float member 42 mounted on a rotatable shaft 43 and counter-balanced by the weighted arm 44. This shaft 43 controls a control switch 45. When the water level in the tank reaches above a predetermined point, sufficient water is delivered to the float member 42 to increase the weight thereof sufficiently to overcome the counter-balancing weight and arm 44 thus rotating the shaft 43 to operate the switch 45 to shut off not only the motor 29 but also the pump supplying syrup to the chamber 14 and the carbonator supplying water to the chamber 13 so that further operation of the mixture is stopped until the mixture level in the tank has been lowered.

On the underside of the top 5 and beneath the discharge openings 6 and 7, I provide an inverted cone baffle 46 having a central discharge opening 47 which, in turn, discharges into a cup 48 mounted to rotate with the shaft 24 and carried by said shaft. Also, carried by said shaft and disposed beneath the cup 48 is a disc-like baffle 49 onto which the contents of the cup 48 is discharged through suitable discharge openings 50 in the cup 48.

The contents of the cup 48 is stirred or mixed through the means of mixing blades 51 which project into the top of the cup and are secured on the underside of the cone-shaped baffle 46. Therefore, as the water and syrup is delivered through the opening of the baffle 48 into the cup, this water and syrup is stirred or mixed before it overflows through the openings 50 and into the tank. After the mixture has been deposited in the tank, it is further agitated and mixed by the paddle 26. However, it is to be noted that due to the baffle 49, the mixed syrup and water is delivered down the sides of the tank 2 rather than directly into the path of the paddle.

The operation of the apparatus is obvious. Carbonated water, being admitted to the chamber 13, is delivered, during the rotation of the valve 8, through the slot 22 into the measuring cups 8. As the valve makes a half revolution, these measuring cups are brought into coincidence with the opening 6 of the top 5 and the measured water thus delivered to the tank 2. Likewise, the syrup in the chamber 14 is delivered to the cups 10 through the opening 23 and when the valve member 8 makes a half turn, these cups 10 discharge through the openings 7 so that with the constant rotation of the valve 8, there is a continuous delivery of measured quantities of syrup and water into the mixing tank wherein the syrup and water is thoroughly mixed to be delivered thence to suitable apparatus for filling containers.

This application is a division of my copending application Serial No. 405,123, filed August 2, 1941.

I claim as my invention:

1. In a mixing apparatus, a mixing tank including a top having concentrically arranged openings therein, a water chamber arranged above said top having a discharge opening in the bottom thereof, a syrup chamber arranged above said top having a discharge opening in the bottom thereof, said openings being arranged in concentric circles and a rotary valve disposed between said tank top and the bottoms of said water and syrup chambers and having a measuring cup therein arranged, during the rotation thereof, to first coincide with the discharge opening in said water chamber and then coincide with one of said concentric openings in the top of said mixing tank, and a second measuring cup in said valve arranged to, during the rotation of said valve, first coincide with the opening in said syrup chamber and then coincide with the other of said concentric openings in the top of said tank.

2. In a mixing apparatus, a mixing tank, means for delivering measured quantities of syrup and water to said tank comprising a water chamber and syrup chamber, each having a delivery opening therein, a rotary valve disposed between said tank and said chambers and having a water measuring cup and a syrup measuring cup adapted, during its rotation, to respectively receive water and syrup from the said chambers and deliver the same to the tank and a substantially inverted cone-shaped reception baffle having a delivery opening substantially at its apex arranged within said tank and receiving quantities of syrup and water therein and delivering the same into said tank.

3. In a mixing apparatus, a mixing tank, means for delivering measured quantities of syrup and water to said tank comprising a water chamber and a syrup chamber, each having a delivery opening therein and a rotary valve disposed between said tank and said chambers and having a water measuring cup and a syrup measuring cup adapted, during its rotation to respectively receive the water and syrup from said chamber and deliver the same to the top of said tank, a rotary cup mounted within said tank and receiving said water and syrup as it is delivered in said tank and stationary baffles projecting into said cup for mixing the water and syrup as the cup is rotated in said tank.

4. In a mixing apparatus, a mixing tank, a syrup receiving chamber and a water receiving chamber mounted above said tank, a rotary valve disposed between said tank and said chambers and having a syrup cup and a water cup therein arranged to receive, respectively, during the rotation of said valve, quantities of syrup and quantities of water and deliver the same to the top of said tank, a paddle rotatably mounted in said tank and rotating on a vertical axis and a baffle disc arranged in said tank above said paddle upon which said syrup is adapted to be discharged as it is delivered to said tank.

5. In a mixing apparatus, a mixing tank having an agitating paddle rotating therein on a vertical axis, a water receiving chamber and a syrup receiving chamber mounted above said tank, a rotary valve disposed between said chambers and the top of said tank having a water receiving cup and a syrup receiving cup adapted to receive water and syrup from said chambers and deliver the same to said tank, an inverted cone disposed beneath the delivery points of said valve and having a delivery opening substantially at the apex thereof, a rotary cup rotating with said agitator disposed above said agitator and adapted to receive the water and syrup from said cone, and a flow disc mounted between said cup and said agitator and adapted to receive the water and syrup from said cup and direct the same toward the sides of said tank.

6. In a mixing apparatus, a mixing tank, a water receiving chamber and a syrup receiving chamber mounted above said tank, a rotary valve disposed between said chambers and the top of said tank having a water receiving cup and a syrup receiving cup adapted, respectively, to receive water and syrup from said chambers and deliver the same to said tank, and means for delivering syrup and water to said respective syrup and water receiving chambers.

7. In a mixing apparatus, a mixing tank, a water receiving chamber and a syrup receiving chamber mounted above said tank, a rotary valve disposed between said chambers and the top of said tank having a water receiving cup and a syrup receiving cup adapted, respectively, to receive water and syrup from said chambers and deliver the same to said tank, and a rotary cup mounted within said tank for receiving the water and syrup delivered by said cups.

JAMES KANTOR.